United States Patent
Rao et al.

[11] Patent Number: 5,536,087
[45] Date of Patent: Jul. 16, 1996

[54] FOIL JOURNAL BEARING HAVING STRAIGHT FOILS USEFUL FOR PROVIDING SUPPORT FOR HIGH SPEED ROTORS AND A PROCESS FOR FABRICATING SAID BEARING

[75] Inventors: Ramamurthy S. R. Rao; Rangarajan Vijayaraghavan; Siddalingappa Siddananjappa; Arun K. Vyasamurthy, all of Bangalore, Ind.

[73] Assignee: Council of Scientific & Industrial Research, New Delhi, Ind.

[21] Appl. No.: 397,392

[22] Filed: Mar. 2, 1995

[51] Int. Cl.$^6$ ............................................. F16C 17/02
[52] U.S. Cl. ............................................. 384/103
[58] Field of Search ............................. 384/103, 106, 384/104, 105

[56] References Cited

U.S. PATENT DOCUMENTS

| | | |
|---|---|---|
| 3,747,997 | 7/1973 | Winn . |
| 4,153,315 | 5/1979 | Silver et al. . |
| 4,195,395 | 4/1980 | Silver et al. ............................... 29/149 |
| 4,526,483 | 7/1985 | Hishikawa et al. ..................... 384/106 |
| 4,699,523 | 10/1987 | Hagemeister ........................... 384/103 |
| 5,032,028 | 7/1991 | Riazuelo et al. ....................... 384/103 |

FOREIGN PATENT DOCUMENTS

| | | |
|---|---|---|
| 0068387 | 1/1983 | European Pat. Off. . |
| 2146845 | 3/1973 | France . |
| 2352985 | 12/1977 | France . |
| 2741368 | 3/1979 | Germany . |
| 2838768 | 3/1980 | Germany . |
| 1066645 | 4/1967 | United Kingdom . |

Primary Examiner—Lenard A. Footland
Attorney, Agent, or Firm—Fish & Richardson

[57] ABSTRACT

A foil journal bearing having straight foil useful for providing support for a high speed rotor and a process for manufacturing the foil journal bearing, said foil journal bearing comprising an outer holder enclosing an inner holder, the inner holder being provided with a plurality of slots for straight flexible foils one end of which being fixed in the corresponding slot of the inner holder, the other end being left free so as to support the rotor of a machine when the bearing is fixed to the machine.

4 Claims, 1 Drawing Sheet

FOIL JOURNAL BEARING HAVING STRAIGHT FOILS USEFUL FOR PROVIDING SUPPORT FOR HIGH SPEED ROTORS AND A PROCESS FOR FABRICATING SAID BEARING

This invention relates to a foil air journal bearing having straight foils useful for providing support for high speed rotors. The present invention also provides a process for the fabrication of the above said foil bearing. Foil bearing is an aerodynamic self-acting bearing which generates its own load supporting air film from the rotation of the shaft itself. It requires no external pressurisation but utilises the freely available ambient air. Foil air bearing is becoming a natural choice in high speed machineries such as turbo machines, cryogenic machines and textile machines in recent years because of its long life, reliability and its attractive weight reduction. The mean time between failures (MTBF is considerably increased when other conventional bearings are replaced by foil bearings. Because of the several advantages of such bearings, significant activity in the field of foil bearings started in mid-1970's. Langlois, W. E. (Finite width foil bearing with light loading. J. Appl. Mech. Trans. ASME, V 42, Ser E, n2, June 1975, 274–278) has illustrated a procedure for computing the deflection of foil bearing using Reynolds equation. Bartz, W. J. (Fundamentals of the foil bearing. Inst. Fuer Erdoelforsch, Hannover, Ger Forsch Ingenieuriwes V 41, n 3, 1975, 69–80) developed the basic equations for bump type bearing using Reynolds equation and foil balance equation. Oh and Rohde (Theoretical investigation of the multi-leaf journal bearing. ASME J. of Applied Mechanics, June 1986, 237–242) in their investigations of multileaf bearing have used finite element method to solve the two dimensional compressible Reynolds equation which governs the fluid flow between the journal surface and the multileaves. The solution of the Reynolds equation is coupled with the load-deflection equations to obtain lift-off speed and minimum film thickness. Bending dominated foil bearing has been analysed by Nagaraj and Nelson (An analysis of gas lubricated foil journal bearings. Tribology Trans. Vol. 35, 1992, n 1, 1–10) using elasto-hydrodynamic principles. The compressible Reynolds equation, which is a non-linear equation is numerically solved by finite difference method alongwith the elasticity equation of foil surface by an iterative scheme. Hener and Collins (Complaint foil gas lubricated bearings. AD-768454 AIRE-SEARCH-73-320269, AFAPL-TR-73-56, 1973) demonstrated the feasibility of foil bearing to a gas turbine environment. Cundiff (Pneumo-mechanical critical speed control for gas turbine engine shaft. AD-772805 MTI-73 TR42 AFAPL-TR-73-101, 1973) used foil bearings to reduce the inner spool vibrations in a small gas turbine engine. Walowitt (Gas lubricated foil bearing technology development for propulsion and power systems. AD-774024 MTI-73 TR 37 AFAPL-TR-73-92, 1973) investigated the suitability of these bearings for propulsion and power systems and also identified the potential coating materials. Koepse (Gas lubricated foil bearing development for advanced turbo-machines. VOL. 1, technical discussion, AD-A042980 AIRESEARCH-76-312202-1, AFAPL-TR-76-114 V 1, 1976) presented a design of gas lubricated foil journal and thrust bearings for applications in 13300N thrust propulsion engine. Bhushan (Self alignment systems for heavily loaded, compliant, hydrodynamic air bearings, ASLE Trans. V 24, n 2, April 1981, 247–256) developed self alignment systems for heavily loaded foil air bearing and evaluated its performance at speeds of the order of 35000 rpm in ambient air. Heshmat (Development of foil journal bearings for high load capacity and high speed whirl stability, J. Lub tech, Trans ASME, Vol. 104, n 2, April 1982, 149–156) has demonstrated the whirl stability at high speeds and also demonstrated the high load capacity of foil bearing. S. Ramamurthy (An experimental parametric study on foil bearing. Proc. IX National Conference on Industrial Tribology, CMTI, Bangalore, February 91, 91–97), has studied the effect of thickness of foil, the effect of orientation angle of foil with respect to Load line and the effect of initial foil clearance on the bearing performance. Ramamurthy (Frictional torque measurement in foil bearing-A simple experimental technique. Proc.X National Conference on Industrial Tribology, IIP, Dehradun, March 93, 66–71, Recent advances in TRIBOLOGY Tata McGraw-Hill 1993), has evaluated the frictional torque in foil air bearings using the coast-down phenomenon. The aerodynamic drag of the turbines is also considered while evaluating the frictional torque.

Earlier work on foil bearings reveals that the foils are bent and one of the ends of foils are fixed rigidly to the housing either by welding or by means of fixtures, such as bolts and nuts alongwith the spring washers. These methods of fixing the foils have the disadvantage that the foils may become loose due to the vibrations transmitted during the high speed rotation of the rotor. Further, the bent foils require special dies for their manufacture. Different shapes of foils are described in the literature. The foil bearings with pre-formed radius have good load carrying capacity. Such bearings are suitable for shaft diameters greater than 25 mm diameter. For small diameter bearings, pre-formed radius foils are difficult to manufacture and assemble. Further, the process of making preformed or bent foils involve the design and development of dies, which are costly and time consuming.

The main objective of the present invention is to provide a foil bearing which is useful for providing support for a high speed rotor.

Another objective of the present invention is to provide a process for the fabrication of the said straight foils, which is very simple.

The invention is described with reference to figures shown in the drawings accompanying the specification, in which FIG. 1 represents cross sectional end view of the foil bearing of the invention.

FIG. 2(a) represents the outer holder which supports the inner holder when assembled.

FIG. 2(b) represents the inner holder.

FIG. 2(c) represents the inner holder having slots.

FIG. 2(d) represents the cross section of the holder with straight foils fixed in position.

FIG. 2(e) shows the assembly of inner holder within the outer holder.

FIG. 2(f) shows the cross section of the final assembly of the invention.

Figure 1:
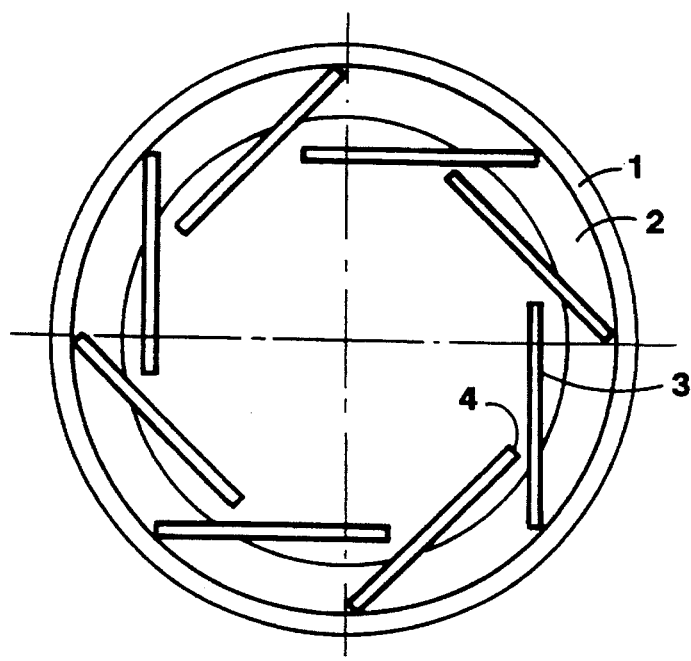

It is apparent from the drawings that FIG. 1 shows cross sectional end view of the foil bearing of the invention. It shows the assembly of foil bearing which consists of an outer holder (1), inner holder (2) which accommodates the straight foils (3). The tips (4) of these foils support the high speed rotor. FIG. 2 represents the procedure for the fabrication of the foil bearing of the present invention with a particular attention of the foil bearing having eight straight foils.

Figure 2A:
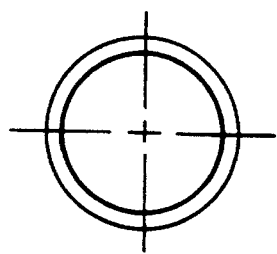
FIGS. 2A–2F represent a manner in which the foil bearing having eight straight foils of the present invention is fabricated in particular.
Figure 2D:
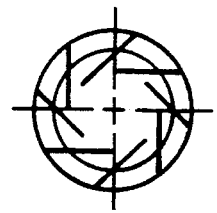
Figure 2B:
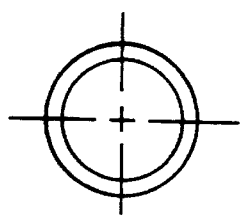
Figure 2E:
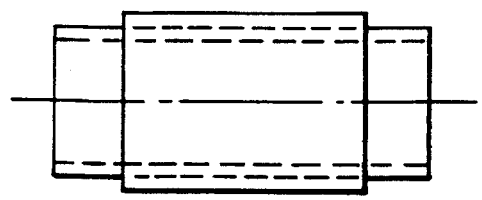
Figure 2C:
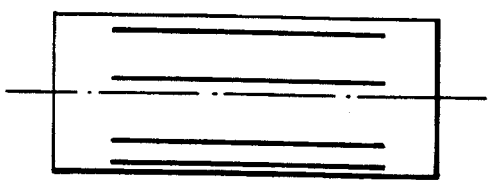
Figure 2F:
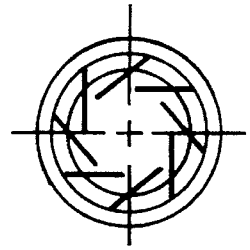

FIG. 2(a) represents the outer holder which supports the inner holder when assembled. FIG. 2(b) represents the inner holder. FIG. 2(c) represents the inner holder with slots cut to accommodate the straight foils in them. FIG. 2(d) represents the cross section of the holder with straight foils fixed in position. FIG. 2(e) represents the assembly of inner holder (with foils) inside the outer holder. FIG. 2(f) represents the cross section of the final assembly of the foil bearing.

Accordingly, the present invention provides a foil bearing having straight foils useful for providing support for a high speed rotor which comprises an outer holder (1) enclosing an inner holder (2), inner holder being provided with a plurality of slots for straight flexible foils (3), one end of which being fixed in the corresponding slot of the inner holder (2) the other end being kept free (4), so as to support the rotor of a machine when the bearing is fixed in the machine.

In a preferred embodiment of the invention, the inner holder may have eight straight foils. The foils may be made of Be—Cu alloy and similar any other alloy having elastic properties and which will withstand high temperatures. The outer holder (1) may be made of mild steel and the inner holder may be made of brass.

According to another feature of the invention, there is a procedure or process for the fabrication of foil bearing having straight foils, which comprises an outer holder (1) enclosing an inner holder (2), inner holder being provided with a plurality of slots for straight flexible foils (3), one end of which being fixed in the corresponding slot of the inner holder (2) the other end being kept free (4), so as to support the rotor of a machine when the bearing is fixed in the machine, said process comprising the steps of:

a. making the outer and the inner holders to the required size;
b. forming the required slots on the inner holder depending on the number of the foils to be fixed to the holder;
c. inserting the straight foils into the said slots;
d. encapsulating the inner holder (alongwith the foils) within the heated outer holder;
e. applying pressure to the assembly resulting in step (d); and
f. cutting the edges of the assembly to the required size.

The functioning of the straight foil bearing of the present invention is provided in detail with particular reference to a textile machinery. This reference is given as an example and it should not be construe to limit the scope of the invention.

The hydrodynamic fluid film which supports the rotor and separates it from the foil is created by the viscous or shear forces acting on the fluid. The rotating shaft drags the boundary layer of fluid with it as it rotates over the bearing surface i.e., the foil. This boundary layer, further drags the layer of air immediately adjacent and in this way, a velocity gradient is established in the gap between the shaft surface and foil surface. This gap is wedge shaped. This pressure of air drawn into the wedge shaped gap creates a pressurised cushion of air film which supports the rotating shaft. The rotor in the bearing will be in contact with the foils only during starts and stops. After the rotor reaches the lift-off speed, the rotor is completely air-borne and hence the wear rate is minimum.

The self-pressurisation nature of the foil bearing obviates the need of any external pressurisation. Thus, the foil bearing of the present invention offers the potential advantages of a high speed, minimum wear rate and long reliable operation.

ADVANTAGES OF THE STRAIGHT FOIL JOURNAL BEARING OF THE PRESENT INVENTION

1. The fabrication involved in making this bearing is extremely simple in nature and does not require any fasteners or nuts or bolts nor any processes like welding.
2. Like any other foil bearing, this bearing requires no lubrication, other than the ambient air or process fluid.
3. Since no external lubrication system is necessary, this bearing is a light weight system—an essential requirement for aerospace applications.
4. The bearing can withstand high temperatures.
5. The bearing is dust tolerant.
6. Inherent property to align itself (because of compliance of foils) and hence small misalignment of shaft is taken care of.

The bearing fabricated according to the invention has been operated at 36,000 rpm and the operation has been found to be smooth and without excessive vibrations. The bearing can replace a roller bearing of textile spindles which presently has the speed limitation of 20,000 rpm. Since the roller bearing generates noise at speeds greater than 20,000 rpm and gets heated up, this foil bearing of the present invention can replace very efficiently the existing rolling element bearing in a textile spindle.

We claim:

1. A foil journal bearing having straight foil useful for providing support for a high speed rotor, which comprises of an outer holder (1) enclosing an inner holder (2) the inner holder being provided with a plurality of slots for straight flexible foils (3) one end of which being fixed in the corresponding slot of the inner holder (2), the other end being left free 4 so as to support the rotor of a machine when the bearing is fixed to the machine.

2. A foil journal bearing as claimed in claim 1 wherein the inner holder contains eight straight foils.

3. A foil journal bearing as claimed in claim 1 wherein the inner and outer holders are made of mild steel or metal alloys which can withstand high temperatures.

4. A foil journal bearing as claimed in claim 1 wherein the straight foil is made up of Be—Cu alloy or any other alloy which is flexible and can withstand high temperatures.

* * * * *